June 22, 1937.  G. A. THOREN  2,084,875
DEVICE FOR ROTATING THERMOMETERS
Filed Oct. 10, 1935
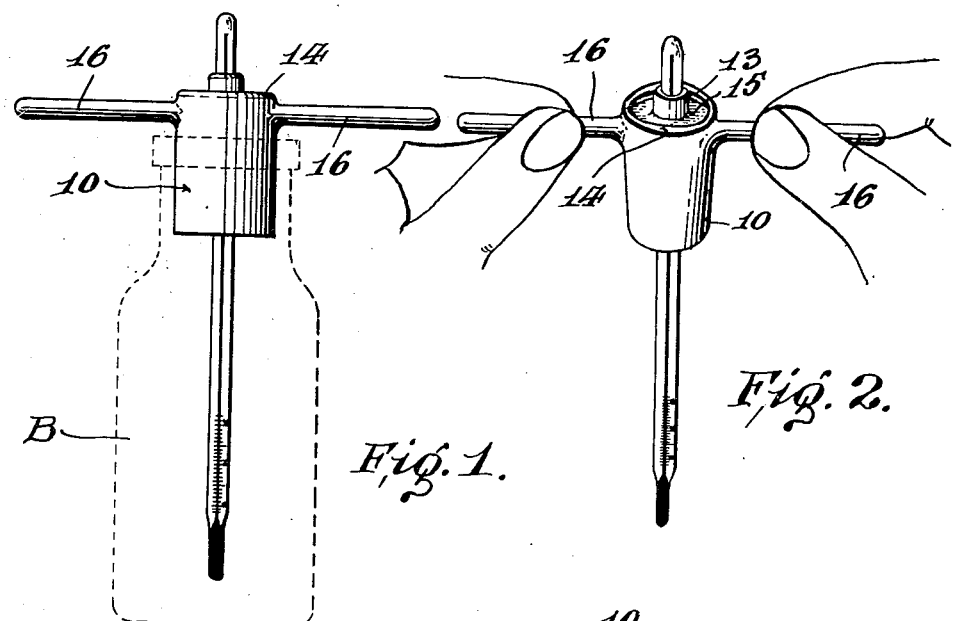
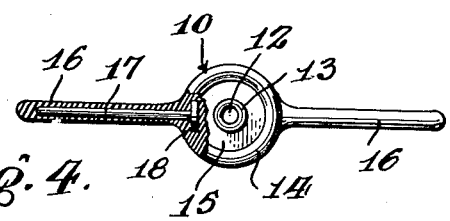
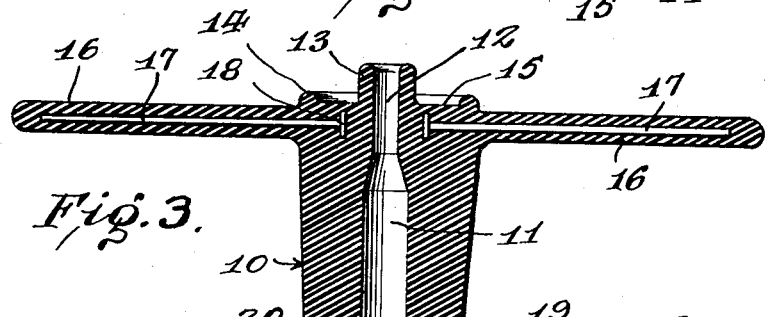
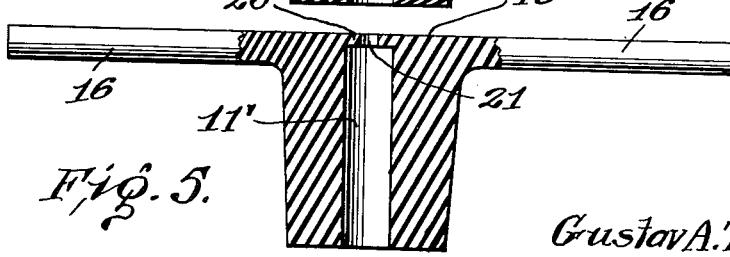
Inventor
Gustav A. Thoren,
By Christian R. Nielsen
Attorney Patented June 22, 1937

2,084,875

UNITED STATES PATENT OFFICE 2,084,875

DEVICE FOR ROTATING THERMOMETERS

Gustav A. Thoren, San Francisco, Calif.

Application October 10, 1935, Serial No. 44,461

6 Claims. (Cl. 73—52)

This application is a continuation, in part, of the invention disclosed in my application filed September 5, 1935, Serial No. 39,357.

The invention relates to a device for rotating thermometers for the purpose of shaking the mercury down in the thermometer to a normal level, and it consists in the constructions, arrangements and combinations herein described and claimed.

It is a cardinal purpose of the invention to provide a device so constructed that thermometers of varying diameters may be readily accommodated and securely held against displacement, especially during the "shaking down" operation.

It is also an object of the invention to provide a device in which the main body thereof may function as a stopper for closing the mouth of a receptacle or bottle which may be employed in conjunction with a suitable sterilizing fluid, for the purpose of sterilizing the thermometer.

It is a still further object of the invention to provide an effective seal between the thermometer and the stopper so that leakage of the sterilizing fluid is obviated.

Additional objects, advantages and features of the invention reside in the construction and arrangement as will be apparent from the following description considered in conjunction with the accompanying drawing, in which Figure 1 is a side elevation of my device, illustrating its application to a sterilizing bottle.

Figure 2 is a perspective view illustrating the device in use.

Figure 3 is an enlarged fragmentary vertical sectional view of the device.

Figure 4 is a top plan view, partly in section.

Figure 5 is a view similar to Figure 3 illustrating a modified form of the device.

In carrying out my invention, I make use of a stopper-like body 10 which should be of rubber or similar elastic material. The stopper 10 has an axial aperture 11 extending throughout the major portion of the length of the stopper and terminates in a reduced aperture 12, as clearly shown in Figure 3.

Upon the upper face of the stopper 10 there is provided an upstanding collar 13 aligned with the aperture 12, and in practice the wall of the collar 13 will be relatively thin so as to afford the necessary flexibility, as will be explained hereinafter. The stopper body terminates at its upper part in a circumscribing flange 14 thereby providing a dished portion 15.

The aperture 11 is formed concentric with the aperture 12, and the former will be of such size as to readily receive the largest size of thermometer snugly therethrough and since the collar 13 will have ample resilience the thermometer may also be forced through the aperture 12, thereof. In case a thermometer of lesser diameter is involved, the sides of the thermometer would pass freely through the aperture 11, but would be embraced and securely retained in the stopper through its engagement with the walls of the reduced aperture 12. The size of the aperture 11 permits more ready insertion of the large size thermometer than would be the case where a single reduced aperture is involved, and also, if a single reduced aperture only was inherent through the length of the stopper, it is quite probable that undue distortion of the elastic body would occur, preventing its insertion into the mouth of a bottle.

It will thus be seen that the thermometers of varying cross sectional configurations and diameters may be readily secured within the stopper, and regardless of the diameters of the thermometers, in all cases, the collar 13 will adhere snugly to the thermometer, so that when the stopper is inserted in a bottle neck for the purpose of sealing the sterilizing fluid therein, liability of seepage or leakage of fluid between the collar 13 and the thermometer is avoided.

The stopper 10 includes a pair of oppositely extended arms 16, integrally formed with the stopper, each arm being of circular shape in cross section. In order to provide an intimate and secure connection between the arms and the body of the stopper, I provide an anchorage 17. In the present instance, I have shown the anchorage in the form of a light metal strip having a head portion 18 embedded in the body of the stopper. The strip extends from the head 18 longitudinally of each arm for a suitable distance. It will of course be understood that other means of anchorage between the stopper and arms may be employed.

In the modified form of the device shown in Figure 5, the stopper 10 has an axial aperture 11' equivalent to the aperture 11. The aperture 11', however, terminates at the upper face portion 19 of the stopper and upon the interior surface of the aperture 11' an annular shoulder 20 is formed. The shoulder 20 thus defines an aperture 21 of considerably lesser diameter than the aperture 11' and this latter aperture will be of such size as to receive the largest size thermometer snugly therethrough and since the shoulder 20 will have ample resilience the thermometer may also be forced through the aperture 21, the material of the shoulder being compressed laterally as well as stretched in a longitudinal direction. In case a thermometer of lesser diameter is involved, the thermometer would pass freely through the aperture 11' but would be securely retained in the stopper through its engagement with the walls of the reduced aperture 21.

In use, the device is gripped as shown in Figure 2, with the finger and thumb of one hand holding one arm lightly, while the thumb and finger of the other hand imparts a rotating movement to the other arm so that the device with the thermometer therein will be rotated and thus the mercury in the thermometer will be shaken down to its normal level.

After use of the thermometer upon a patient, in order to effect proper sterilization, the thermometer is inserted into a suitable receptacle or bottle, indicated at B and the stopper 10 inserted into the mouth thereof. The bottle will contain any suitable sterilizing fluid, such as alcohol, and inasmuch as the stopper will firmly seat in the mouth thereof and the thermometer similarly engaged in the apertures 11 and 12, or 11' and 21, as the case may be, the bottle and associated shake-down device may be readily carried in portable medicine grips, such as employed by doctors and nurses, without liability of spilling the sterilizing fluid.

While I have shown and described preferred constructions, this is by way of illustration only, and I consider as my own, all such modifications as fairly fall within the scope of the appended claims.

I claim:—

1. A device of the character described comprising an elongated resilient body member including an axial aperture for receiving a thermometer therethrough, said aperture having a reduced portion for further engaging a thermometer, and means on the body for rotating the same.

2. A device of the character described comprising a resilient body member having an aperture for receiving a thermometer therethrough, said aperture having a reduced portion adjacent one end for further engaging a thermometer, an upstanding collar on the body member circumscribing the reduced portion, and means on the body member for rotating the same.

3. A device of the character described comprising a resilient body member having an aperture for receiving a thermometer therethrough, said aperture having a reduced portion adjacent one end for further engaging a thermometer, an upstanding collar on the body member circumscribing the reduced portion, said collar having an interior dimension approximately that of the reduced aperture, and said body member having oppositely extended arms for rotating the same.

4. A device of the character described comprising a resilient body member having an aperture for receiving a thermometer therethrough, said aperture having a reduced portion adjacent one end for further engaging a thermometer, an upstanding collar on the body member circumscribing the reduced portion, said collar having an interior dimension approximately that of the reduced aperture, and said body member having oppositely extended arms for rotating the same, and reinforcing means between the arms and body member.

5. A device of the character described comprising a resilient body member having an aperture for receiving and frictionally binding a thermometer therein, a circumscribing flange on one end of the body member, a collar on the body member in alignment with the aperture and concentric with the flange and oppositely extended arms on the body member for rotating the same, said arms having means interiorly thereof for anchorage to the body member.

6. A device of the character described comprising an elongated resilient body member, said body member having an axial aperture, an annular flexible shoulder upon the interior of the aperture, said shoulder defining an aperture of lesser diameter than the first named aperture whereby thermometers of other than standard diameters may be engaged and retained within the apertures, and said body member having oppositely extended arms for rotating the same.

GUSTAV A. THOREN.